US012393241B1

(12) United States Patent
Dunn et al.

(10) Patent No.: US 12,393,241 B1
(45) Date of Patent: Aug. 19, 2025

(54) DISPLAY ASSEMBLY USING AIR CHARACTERISTIC DATA TO VERIFY DISPLAY ASSEMBLY OPERATING CONDITIONS, SYSTEMS AND METHODS FOR THE SAME

(71) Applicant: Manufacturing Resources International, Inc., Alpharetta, GA (US)

(72) Inventors: William Dunn, Alpharetta, GA (US); Mike Brown, Cumming, GA (US); John Schuch, Buford, GA (US); Ryan Duquette, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 19/087,140

(22) Filed: Mar. 21, 2025

Related U.S. Application Data (60) Provisional application No. 63/574,559, filed on Apr. 4, 2024.

(51) Int. Cl.
*G06F 1/20* (2006.01)
*G06F 1/16* (2006.01)

(52) U.S. Cl.
CPC ............ *G06F 1/206* (2013.01); *G06F 1/1656* (2013.01); *G06F 1/1677* (2013.01); *G06F 1/1684* (2013.01); *G06F 1/203* (2013.01)

(58) Field of Classification Search
CPC ...... G06F 1/206; G06F 1/1656; G06F 1/1677; G06F 1/1684; G06F 1/203
See application file for complete search history.

(56) References Cited

U.S. PATENT DOCUMENTS

| 3,504,528 A | 4/1970 | Weinberg et al. |
| 3,807,220 A | 4/1974 | Ottenstein et al. |

(Continued)

FOREIGN PATENT DOCUMENTS

| CN | 203277867 U | 11/2013 |
| CN | 110441008 A | 11/2019 |

(Continued)

OTHER PUBLICATIONS

Photo Research, Inc., PR®-650 SpectraScan® Colorimeter, 1999, 2 pages.

(Continued)

*Primary Examiner* — Mi'schita' Henson
(74) *Attorney, Agent, or Firm* — Standley Law Group LLP; Jeffrey S. Standley; Adam J. Smith (57) ABSTRACT

Display assemblies utilizing air characteristic data to verify internal operating conditions and related systems and methods are disclosed. The display assembly includes a side assembly, including an electronic display, is connected to a structural framework. Sensor(s) are provided, at least one of which is located at, or fluidly connected to, a closed airflow pathway. A controller receives data from the sensor(s) and determines whether an initial indication of an operating condition exists. If so, a testing routine is initiated, additional data is received from the sensor(s) during and/or thereafter. The controller confirms whether the operating condition exists based on the additional data.

20 Claims, 6 Drawing Sheets

(56) References Cited

U.S. PATENT DOCUMENTS

| | | |
|---|---|---|
| 4,527,804 A | 7/1985 | Spencer |
| 5,162,785 A | 11/1992 | Fagard |
| 5,168,961 A | 12/1992 | Schneider |
| 5,228,339 A | 7/1993 | Maresca, Jr. et al. |
| 5,322,051 A | 6/1994 | Patterson et al. |
| 5,351,201 A | 9/1994 | Harshbarger, Jr. et al. |
| 5,590,831 A | 1/1997 | Manson et al. |
| 5,751,346 A | 5/1998 | Dozier et al. |
| 5,786,801 A | 7/1998 | Ichise |
| 5,952,992 A | 9/1999 | Helms |
| 6,042,443 A | 3/2000 | Carella et al. |
| 6,144,359 A | 11/2000 | Grave |
| 6,157,143 A | 12/2000 | Bigio et al. |
| 6,158,692 A | 12/2000 | Abild et al. |
| 6,215,411 B1 | 4/2001 | Gothard |
| 6,222,841 B1 | 4/2001 | Taniguchi |
| 6,259,492 B1 | 7/2001 | Imoto et al. |
| 6,374,187 B1 | 4/2002 | Knight et al. |
| 6,384,736 B1 | 5/2002 | Gothard |
| 6,421,694 B1 | 7/2002 | Nawaz et al. |
| 6,509,911 B1 | 1/2003 | Shimotono |
| 6,526,807 B1 | 3/2003 | Doumit et al. |
| 6,546,294 B1 | 4/2003 | Kelsey et al. |
| 6,553,336 B1 | 4/2003 | Johnson et al. |
| 6,556,258 B1 | 4/2003 | Yoshida et al. |
| 6,587,525 B2 | 7/2003 | Jeong et al. |
| 6,701,143 B1 | 3/2004 | Dukach et al. |
| 6,753,842 B1 | 6/2004 | Williams et al. |
| 6,771,795 B1 | 8/2004 | Isnardi |
| 6,812,851 B1 | 11/2004 | Dukach et al. |
| 6,821,179 B2 | 11/2004 | Ando |
| 6,850,209 B2 | 2/2005 | Mankins et al. |
| 6,955,170 B1 | 10/2005 | Mullins et al. |
| 6,968,375 B1 | 11/2005 | Brown |
| 7,007,545 B1 | 3/2006 | Martinek |
| 7,064,672 B2 | 6/2006 | Gothard |
| 7,319,862 B1 | 1/2008 | Lincoln et al. |
| 7,330,002 B2 | 2/2008 | Joung |
| 7,380,265 B2 | 5/2008 | Jensen et al. |
| 7,391,317 B2 | 6/2008 | Abraham et al. |
| 7,451,332 B2 | 11/2008 | Culbert et al. |
| 7,474,294 B2 | 1/2009 | Leo et al. |
| 7,516,223 B2 | 4/2009 | Whitehead |
| 7,577,458 B2 | 8/2009 | Lin |
| 7,581,094 B1 | 8/2009 | Apostolopoulos et al. |
| 7,595,785 B2 | 9/2009 | Jang |
| 7,612,278 B2 | 11/2009 | Sitrick et al. |
| 7,636,927 B2 | 12/2009 | Zigmond et al. |
| 7,658,787 B2 | 2/2010 | Morse et al. |
| 7,675,862 B2 | 3/2010 | Pham et al. |
| 7,679,279 B2 | 3/2010 | Kamio et al. |
| 7,751,813 B2 | 7/2010 | Varanda |
| 7,764,280 B2 | 7/2010 | Shiina |
| 7,774,633 B1 | 8/2010 | Harrenstien et al. |
| 7,795,821 B2 | 9/2010 | Jun |
| 7,882,728 B2 | 2/2011 | Kizaki et al. |
| 7,889,852 B2 | 2/2011 | Whitehead |
| 7,949,893 B1 | 5/2011 | Knaus et al. |
| 8,074,627 B2 | 12/2011 | Siddiqui et al. |
| 8,212,921 B2 | 7/2012 | Yun |
| 8,218,812 B2 | 7/2012 | Sugimoto et al. |
| 8,248,203 B2 | 8/2012 | Hanwright et al. |
| 8,336,369 B2 | 12/2012 | Mahoney |
| 8,441,574 B2 | 5/2013 | Dunn et al. |
| 8,483,554 B2 | 7/2013 | Takimoto et al. |
| 8,601,252 B2 | 12/2013 | Mendelow et al. |
| 8,612,608 B2 | 12/2013 | Whitehead |
| 8,654,302 B2 | 2/2014 | Dunn et al. |
| 8,689,343 B2 | 4/2014 | De Laet |
| 8,767,165 B2 | 7/2014 | Dunn |
| 8,854,595 B2 | 10/2014 | Dunn |
| 8,881,576 B2 | 11/2014 | Schwartz et al. |
| 9,026,686 B2 | 5/2015 | Dunn et al. |
| 9,147,194 B1 | 9/2015 | Le et al. |
| 9,363,262 B1 | 6/2016 | Wilkes |
| 9,629,287 B2 | 4/2017 | Dunn |
| 9,760,151 B1 | 9/2017 | Hou |
| 10,170,076 B2 | 1/2019 | Wang et al. |
| 10,174,519 B1 | 1/2019 | Carpenter et al. |
| 10,311,763 B2 | 6/2019 | Greenfield |
| 10,578,658 B2 | 3/2020 | Dunn et al. |
| 10,593,175 B2 | 3/2020 | Jennings et al. |
| 11,131,453 B2 | 9/2021 | Kim et al. |
| 11,402,940 B2 | 8/2022 | Dunn |
| 11,645,029 B2 | 5/2023 | Newnham et al. |
| 11,803,344 B2 | 10/2023 | Newnham et al. |
| 11,965,804 B2 | 4/2024 | Dunn et al. |
| 11,972,672 B1 | 4/2024 | Dunn |
| 2002/0019933 A1 | 2/2002 | Friedman et al. |
| 2002/0026354 A1 | 2/2002 | Shoji et al. |
| 2002/0065046 A1 | 5/2002 | Mankins et al. |
| 2002/0112026 A1 | 8/2002 | Fridman et al. |
| 2002/0120721 A1 | 8/2002 | Eilers et al. |
| 2002/0147648 A1 | 10/2002 | Fadden et al. |
| 2002/0152425 A1 | 10/2002 | Chaiken et al. |
| 2002/0163513 A1 | 11/2002 | Tsuji |
| 2002/0163916 A1 | 11/2002 | Oskouy et al. |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0097497 A1 | 5/2003 | Esakov |
| 2003/0098881 A1 | 5/2003 | Nolte et al. |
| 2003/0115591 A1 | 6/2003 | Weissmueller, Jr. et al. |
| 2003/0117714 A1 | 6/2003 | Nakamura et al. |
| 2003/0132514 A1 | 7/2003 | Liebeskind |
| 2003/0161354 A1 | 8/2003 | Bader et al. |
| 2003/0177269 A1 | 9/2003 | Robinson et al. |
| 2003/0192060 A1 | 10/2003 | Levy |
| 2003/0196208 A1 | 10/2003 | Jacobson |
| 2003/0214242 A1 | 11/2003 | Berg-johansen |
| 2003/0230991 A1 | 12/2003 | Muthu et al. |
| 2004/0036697 A1 | 2/2004 | Kim et al. |
| 2004/0138840 A1 | 7/2004 | Wolfe |
| 2004/0158872 A1 | 8/2004 | Kobayashi |
| 2004/0194131 A1 | 9/2004 | Ellis et al. |
| 2004/0210419 A1 | 10/2004 | Wiebe et al. |
| 2004/0243940 A1 | 12/2004 | Lee et al. |
| 2004/0252400 A1 | 12/2004 | Blank et al. |
| 2004/0253947 A1 | 12/2004 | Phillips et al. |
| 2004/0255848 A1 | 12/2004 | Yudasaka |
| 2005/0033840 A1 | 2/2005 | Nisani et al. |
| 2005/0070335 A1 | 3/2005 | Jitsuishi et al. |
| 2005/0071252 A1 | 3/2005 | Henning et al. |
| 2005/0073518 A1 | 4/2005 | Bontempi |
| 2005/0088984 A1 | 4/2005 | Chin et al. |
| 2005/0123001 A1 | 6/2005 | Craven et al. |
| 2005/0132036 A1 | 6/2005 | Jang et al. |
| 2005/0179554 A1 | 8/2005 | Lu |
| 2005/0216939 A1 | 9/2005 | Corbin |
| 2005/0231457 A1 | 10/2005 | Yamamoto et al. |
| 2005/0258921 A1 | 11/2005 | Puskar et al. |
| 2005/0267943 A1 | 12/2005 | Castaldi et al. |
| 2005/0289061 A1 | 12/2005 | Kulakowski et al. |
| 2005/0289588 A1 | 12/2005 | Kinnear |
| 2006/0007107 A1 | 1/2006 | Ferguson |
| 2006/0022616 A1 | 2/2006 | Furukawa et al. |
| 2006/0150222 A1 | 7/2006 | McCafferty et al. |
| 2006/0160614 A1 | 7/2006 | Walker et al. |
| 2006/0269216 A1 | 11/2006 | Wiemeyer et al. |
| 2007/0039028 A1 | 2/2007 | Bar |
| 2007/0154060 A1 | 7/2007 | Sun |
| 2007/0157260 A1 | 7/2007 | Walker |
| 2007/0168539 A1 | 7/2007 | Day |
| 2007/0200513 A1 | 8/2007 | Ha et al. |
| 2007/0214812 A1 | 9/2007 | Wagner et al. |
| 2007/0237636 A1 | 10/2007 | Hsu |
| 2007/0268241 A1 | 11/2007 | Nitta et al. |
| 2007/0273519 A1 | 11/2007 | Ichikawa et al. |
| 2007/0274400 A1 | 11/2007 | Murai et al. |
| 2007/0286107 A1 | 12/2007 | Singh et al. |

(56) References Cited

U.S. PATENT DOCUMENTS

| | | |
|---|---|---|
| 2007/0291198 A1 | 12/2007 | Shen |
| 2008/0008471 A1 | 1/2008 | Dress |
| 2008/0019147 A1 | 1/2008 | Erchak et al. |
| 2008/0024268 A1 | 1/2008 | Wong et al. |
| 2008/0034205 A1 | 2/2008 | Alain et al. |
| 2008/0037466 A1 | 2/2008 | Ngo et al. |
| 2008/0037783 A1 | 2/2008 | Kim et al. |
| 2008/0055297 A1 | 3/2008 | Park |
| 2008/0104631 A1 | 5/2008 | Krock et al. |
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0267328 A1 | 10/2008 | Ianni et al. |
| 2008/0278099 A1 | 11/2008 | Bergfors et al. |
| 2008/0281165 A1 | 11/2008 | Rai et al. |
| 2008/0303918 A1 | 12/2008 | Keithley |
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0034283 A1 | 2/2009 | Albright et al. |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0152445 A1 | 6/2009 | Gardner, Jr. |
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0226091 A1 | 9/2010 | Dunn |
| 2010/0231563 A1 | 9/2010 | Dunn et al. |
| 2010/0237697 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0058326 A1 | 3/2011 | Idems et al. |
| 2011/0078536 A1 | 3/2011 | Han et al. |
| 2011/0173853 A1 | 7/2011 | Leveque |
| 2011/0283199 A1 | 11/2011 | Schuch et al. |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0007110 A1 | 1/2013 | Centner |
| 2013/0162908 A1 | 6/2013 | Son et al. |
| 2013/0173358 A1 | 7/2013 | Pinkus |
| 2013/0282154 A1 | 10/2013 | Chappell et al. |
| 2014/0002747 A1 | 1/2014 | Macholz |
| 2014/0009893 A1 | 1/2014 | Lai |
| 2014/0172174 A1 | 6/2014 | Poss et al. |
| 2014/0230526 A1 | 8/2014 | Willemin et al. |
| 2014/0287671 A1 | 9/2014 | Slessman |
| 2015/0169827 A1 | 6/2015 | LaBorde |
| 2015/0193074 A1 | 7/2015 | Cudak et al. |
| 2015/0250021 A1 | 9/2015 | Stice et al. |
| 2015/0316944 A1 | 11/2015 | Thellend |
| 2016/0034240 A1 | 2/2016 | Kreiner et al. |
| 2016/0112521 A1 | 4/2016 | Lawson et al. |
| 2016/0125468 A1 | 5/2016 | Staneluis et al. |
| 2016/0125772 A1 | 5/2016 | Li et al. |
| 2016/0292744 A1 | 10/2016 | Strimaitis et al. |
| 2017/0075777 A1 | 3/2017 | Dunn et al. |
| 2017/0082433 A1 | 3/2017 | Huo et al. |
| 2017/0083043 A1 | 3/2017 | Bowers et al. |
| 2017/0091822 A1 | 3/2017 | Tian et al. |
| 2017/0138814 A1 | 5/2017 | Dempsey et al. |
| 2017/0163519 A1 | 6/2017 | Bowers et al. |
| 2017/0219457 A1 | 8/2017 | Keil et al. |
| 2017/0242502 A1 | 8/2017 | Gray et al. |
| 2017/0242534 A1 | 8/2017 | Gray |
| 2017/0256051 A1 | 9/2017 | Dwivedi et al. |
| 2017/0315886 A1 | 11/2017 | Helmick et al. |
| 2018/0027635 A1 | 1/2018 | Roquemore, III |
| 2018/0080670 A1 | 3/2018 | Carlyon et al. |
| 2018/0089717 A1 | 3/2018 | Morin et al. |
| 2018/0128708 A1 | 5/2018 | Cirino |
| 2018/0181091 A1 | 6/2018 | Funk et al. |
| 2018/0268783 A1 | 9/2018 | Woo |
| 2018/0284758 A1 | 10/2018 | Cella et al. |
| 2018/0306052 A1 | 10/2018 | Lammers et al. |
| 2018/0314103 A1 | 11/2018 | Dunn et al. |
| 2019/0087042 A1 | 3/2019 | Van Ostrand et al. |
| 2019/0096202 A1 | 3/2019 | Seelman |
| 2019/0122082 A1 | 4/2019 | Cuban et al. |
| 2019/0171331 A1 | 6/2019 | Gray et al. |
| 2019/0367148 A1 | 12/2019 | Kehlenbeck et al. |
| 2020/0012383 A1 | 1/2020 | Wang et al. |
| 2020/0019363 A1 | 1/2020 | Newnham et al. |
| 2020/0272269 A1 | 8/2020 | Dunn |
| 2021/0174715 A1 | 6/2021 | Holloway et al. |
| 2021/0397292 A1 | 12/2021 | Dunn |
| 2022/0019085 A1* | 1/2022 | Osterhout ............... G06F 1/203 |
| 2022/0147168 A1 | 5/2022 | Lee et al. |
| 2022/0260872 A1 | 8/2022 | Dunn et al. |
| 2023/0029615 A1 | 2/2023 | Dunn et al. |
| 2023/0032626 A1 | 2/2023 | Brown |
| 2023/0048815 A1 | 2/2023 | Newnham et al. |
| 2023/0052966 A1 | 2/2023 | Newnham et al. |
| 2023/0160774 A1 | 5/2023 | Dunn et al. |
| 2023/0333423 A1 | 10/2023 | Dunn et al. |
| 2023/0384277 A1 | 11/2023 | Dunn et al. |
| 2024/0144806 A1 | 5/2024 | Dunn |
| 2024/0201040 A1 | 6/2024 | Dunn et al. |

FOREIGN PATENT DOCUMENTS

| | | |
|---|---|---|
| CN | 114503233 A | 5/2022 |
| CN | 217384567 U | 9/2022 |
| EP | 0313331 B1 | 2/1994 |
| EP | 1628087 A1 | 2/2006 |
| EP | 1821538 A1 | 8/2007 |
| EP | 2351369 A2 | 8/2011 |
| JP | 61-234690 A | 10/1986 |
| JP | 61-251901 A | 11/1986 |
| JP | 7-74224 A | 3/1995 |
| JP | 2000122575 A | 4/2000 |
| JP | 3080628 B2 | 8/2000 |
| JP | 2002064842 A | 2/2002 |
| JP | 2002209230 A | 7/2002 |
| JP | 2005-211449 A | 8/2005 |
| JP | 2005-211451 A | 8/2005 |
| JP | 2005236469 A | 9/2005 |
| JP | 2005333568 A | 12/2005 |
| JP | 2010282109 A | 12/2010 |
| KR | 200361111 Y1 | 9/2004 |
| KR | 10-2010-0081354 A | 7/2010 |
| KR | 10-2011-0065338 A | 6/2011 |
| WO | 9608892 A1 | 3/1996 |
| WO | 2008050402 A1 | 5/2008 |
| WO | 2012/127971 A1 | 9/2012 |
| WO | 2013/182733 A1 | 12/2013 |
| WO | 2019064453 A1 | 4/2019 |
| WO | 2020/042755 A1 | 3/2020 |
| WO | 2023/009477 A1 | 2/2023 |

OTHER PUBLICATIONS

Texas Advanced Optoelectronic Solutions Inc., TCS230 Programmable Color Light-To-Frequency Converter, Dec. 2007, 12 pages.

(56) References Cited

OTHER PUBLICATIONS

Methven, Don, Wireless Video Streaming: An Overview, Nov. 16, 2022, 7 pages.
Outdoorlink, Inc., SmartLink One, One Relay, http://smartlinkcontrol.com/billboard/one-relay/, retrieved Apr. 17, 2019, 2007-16, 6 pages.
Outdoorlink, Inc., SmartLink Website User Manual, http://smartlink.outdoorlinkinc.com/docs/SmartLinkWebsiteUserManual.pdf, 2017, 33 pages.
Outdoorlink, Inc., SmartLink One Out of Home Media Controller, 2016, 1 page.
Sigmasense, Analog can't touch Digital, https://sigmasense.com/, retrieved Jan. 23, 2019, 5 pages.
Sigmasense, Solutions, https://sigmasense.com/solutions/, retrieved Jan. 23, 2019, 4 pages.
Sigmasense, Technology, https://sigmasense.com/technology/, retrieved Jan. 23, 2019, 3 pages.
Turley, Jim, SigmaSense ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

* cited by examiner

DISPLAY ASSEMBLY USING AIR CHARACTERISTIC DATA TO VERIFY DISPLAY ASSEMBLY OPERATING CONDITIONS, SYSTEMS AND METHODS FOR THE SAME

CROSS-REFERENCE TO RELATED APPLICATIONS

This application claims the benefit of U.S. provisional patent application Ser. No. 63/574,559 filed Apr. 4, 2024, the disclosures of which are hereby incorporated by reference as if fully restated herein.

TECHNICAL FIELD

Exemplary embodiments relate generally to display assemblies which use air characteristic data to verify operating conditions as well as systems and methods for the same.

BACKGROUND AND SUMMARY OF THE INVENTION

Electronic displays are used in a wide variety of applications, such as digital out of home (DOOH) advertising, by way of example. DOOH advertising is an increasingly popular way to reach potential customers, or the public more generally. Generally, such DOOH advertising units include electronic displays placed within at least partially ruggedized enclosures to protect the sensitive electronics from the elements, vandals, general wear and tear, and the like.

Display assemblies are known which utilize various sensors to monitor operating conditions of the assembly. Where sensor values indicate a problem with the unit, a team may be dispatched to service the unit. Sometimes, false positive or false negative alerts are encountered. This may be, at least in part, due to the large variety of operating conditions for such units, especially DOOH advertising units which operate in a wide variety of environments (e.g., climates, seasonal conditions, weather, diurnal fluctuations, urban environments, and the like). Sensor failure, sensor error, or other factors may also cause such false alerts. What is needed is a display assembly which can better verify the existence and/or nature of operating conditions of the display assembly.

Display assemblies are provided which utilize certain air characteristic data to verify indicated operating conditions of the assembly. Such air characteristic data may be derived from one or more sensors and may include, by way of example and without limitation, pressure, humidity, and/or temperature. In an exemplary embodiment, a door open indication is received, such as from a door and/or latch sensor. Pressure and/or humidity check routines are initiated, such as leak down testing and/or dew point spread (DPS) calculations. Where pressure and/or humidity test data indicates significant changes, such as significantly lower leak down times and/or significantly decreased DPS calculations, the door open indication may be verified. In another exemplary embodiment, a condition alert is indicated, such as a likely leak, condensation likely present, or the like. Pressure and/or humidity check routines are initiated, such as leak down testing and/or DPS calculations. Where pressure and/or humidity test data indicates significant changes, such as significantly lower leak down times and/or significantly decreased DPS calculations, the condition alert may be verified. In yet another exemplary embodiment, a condition alert is indicated, such as a door open, likely leak, condensation likely present, or the like. Testing routines are initiated, which may include commanding operations which cause a sudden, temporary increase in internal temperature (e.g., activating/increasing backlight levels, slowing/stopping fans, combinations thereof, or the like). Pressure response may be analyzed. Where the pressure changes outside of expected parameters, the condition alert may be confirmed. Essentially, where the pressure response is relatively minimal, this may indicate a not well sealed condition which may be used to verify the initially indicated condition, such as a door open, likely leak, condensation likely present, or the like.

A wide variety of operating conditions may be verified by using some or all of the aforementioned techniques. Upon verification, an electronic notification may be generated, which may be an initial notification or a confirmatory notification, by way of non-limiting example.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
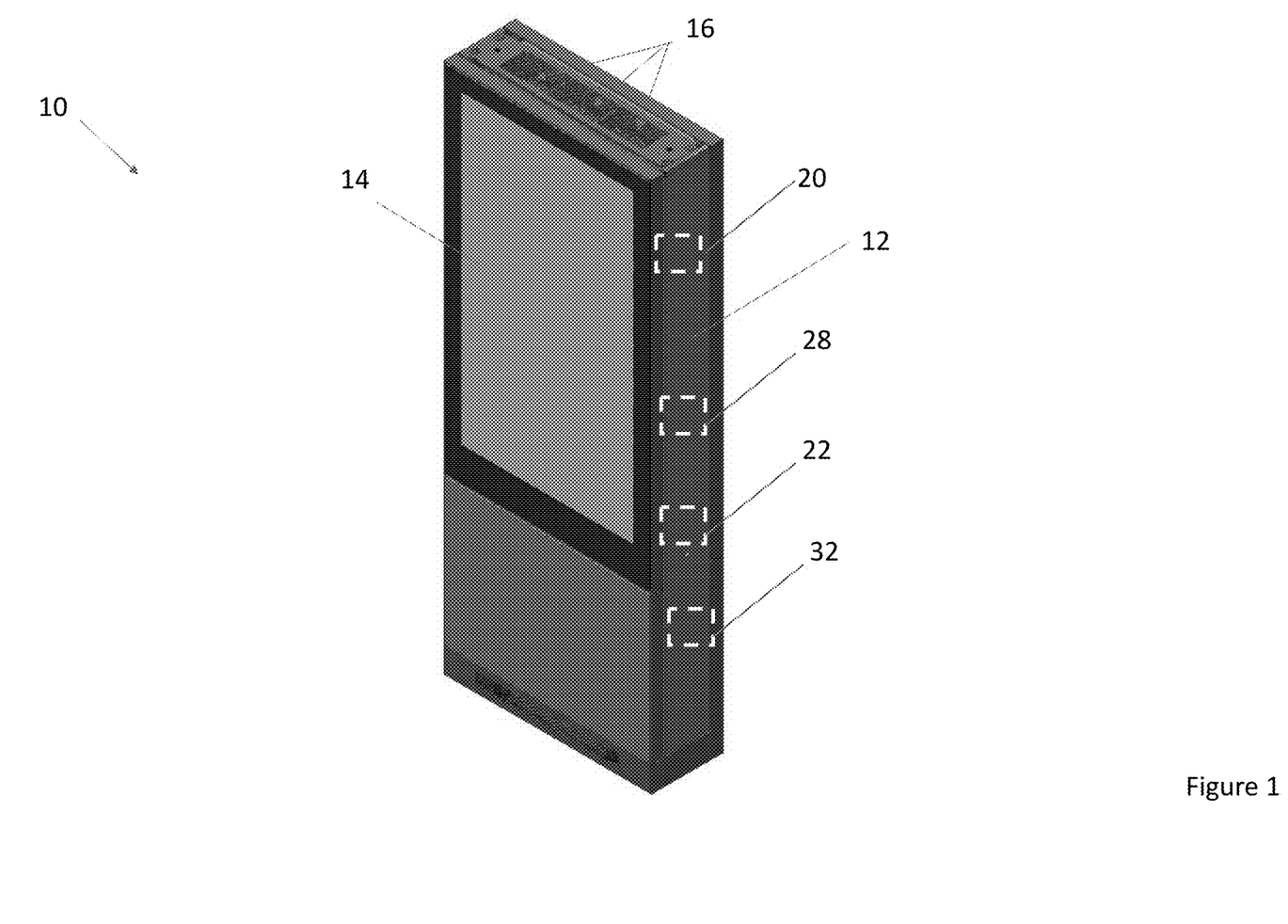
FIG. 1 is a perspective view of an exemplary display assembly.
Figure 2:
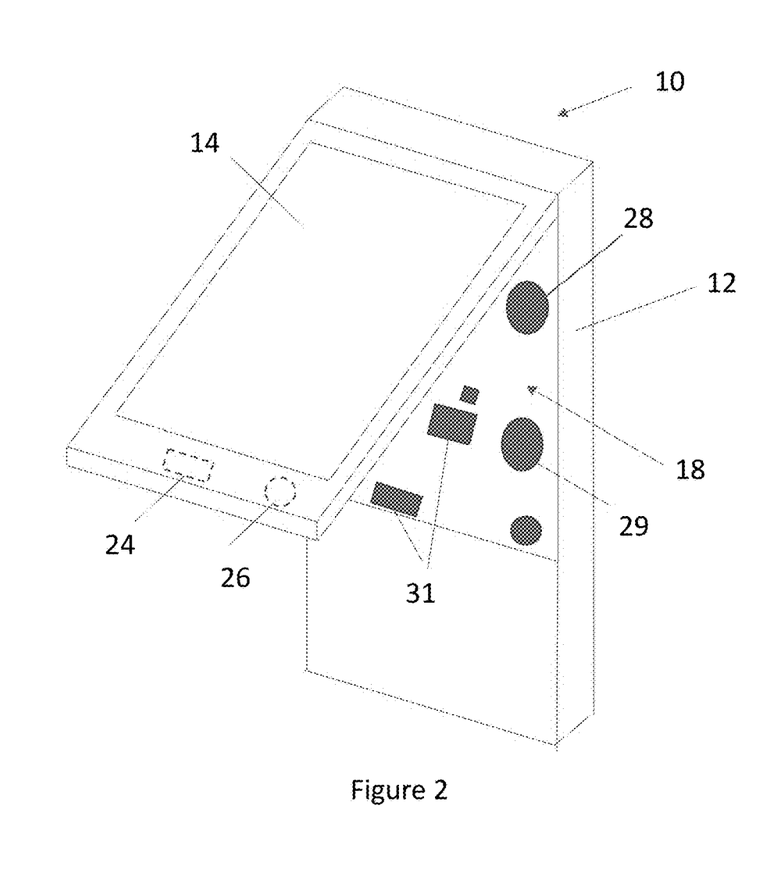
FIG. 2 is another perspective view of the display assembly of FIG. 1 with a side assembly in an opened position.
Figure 3:
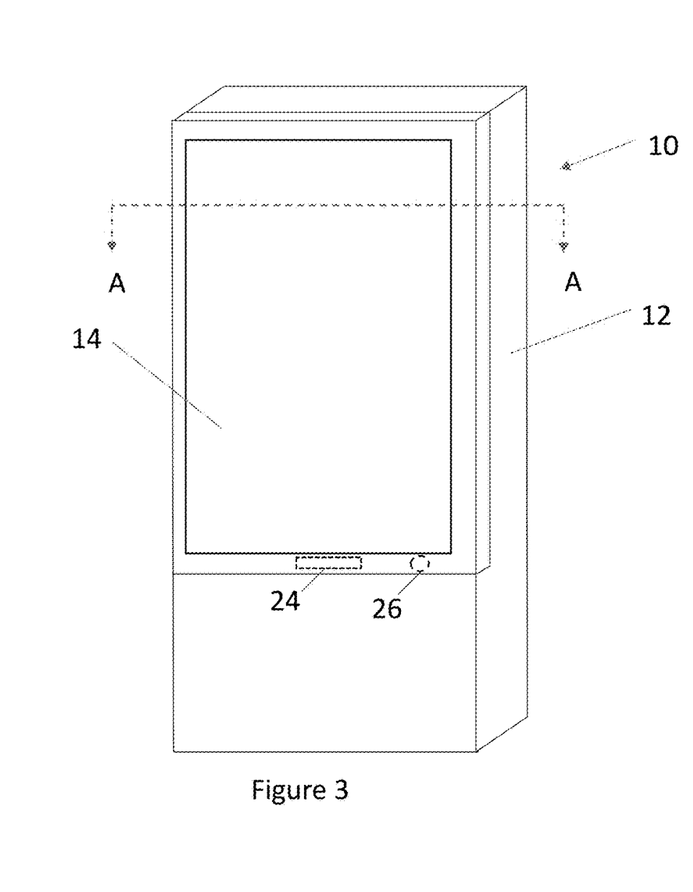
FIG. 3 is the display assembly of FIG. 2 with the side assembly in a closed position.

FIG. 1 through FIG. 3 illustrate an exemplary display assembly 10. The display assembly 10 may comprise a structural framework 12, such as for mounting to a ground surface (e.g., sidewalk, parking lot, etc.), wall, item of street furniture (e.g., bus shelter, lamp post, railing, etc.), combinations thereof, or the like. The structural framework 12 may comprise one or more members, cladding, paneling, grills, combinations thereof, or the like.

One or more side assemblies 14 may be connected (directly or indirectly) to a side of the structural framework 12. For example, without limitation, a first and second side assembly 14 may be positioned on opposing sides of the structural framework 12. However, other number and/or arrangement may be utilized (e.g., one sided, triangular, multiple displays on a given side, displays on four sides, etc.).

The side assemblies 14 may each be configured for movement between a closed position (e.g., FIG. 3) where the side assembly 14 is proximate to the structural framework 12 and an opened position (e.g., FIG. 2) where the side assembly 14 is moved away from the structural framework 12. However, this feature is optional. For example, without limitation, a bottom edge of the side assembly 14 may be capable of swinging outward, such as by way of hinges located along an upper edge thereof where the side assembly 14 connects to the structural framework 12. As another example, without limitation, a first side edge (e.g., left side) of the side assembly 14 may be capable of swinging outward, such as by way of hinges located a second side edge (e.g., right side) thereof where the side assembly 14 connects to the structural framework 12. Gas struts, hinges, springs, counterweights, cables, combinations thereof, or the like.

Figure 4:
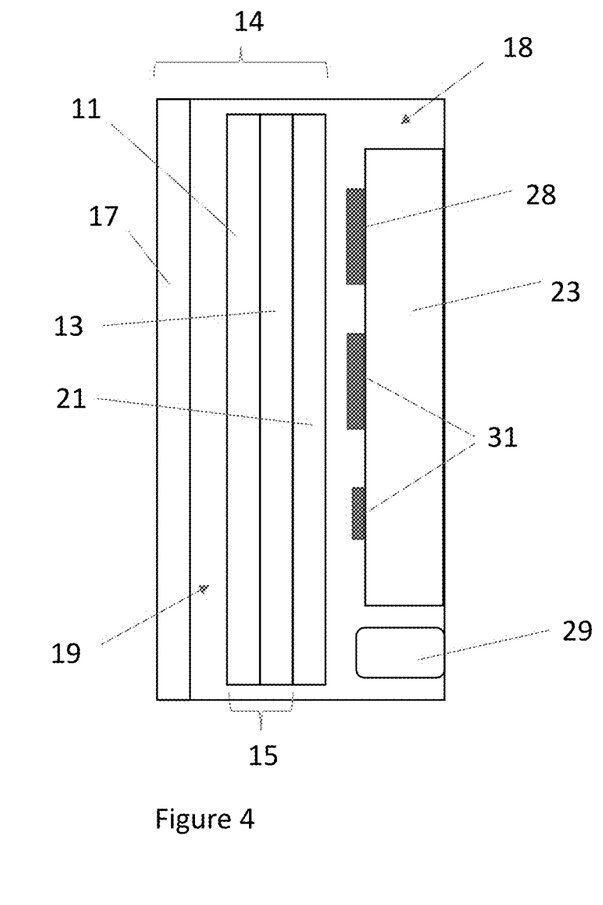
FIG. 4 is a detailed, top, sectional view of the side assembly of FIGS. 1-3, taken along section line A-A of FIG. 3.

FIG. 4 illustrates an exemplary side assembly 14 in more detail. The side assemblies 14 may each comprise one or more electronic displays 15 (hereinafter also a "digital side assembly"), preferably set behind a cover 17. The cover 17 may form part of the side assembly 14 or the structural framework 12. The electronic displays 15 may be of various type, such as a liquid crystal display (LCD), organic light emitting diodes (OLED) display, light emitting diodes (LED, direct LED) display, combinations thereof, or the like. The cover 17 may comprise one or more layers. The electronic displays 15 and/or covers 17 may comprise various optical layers, such as polarizers, antireflective films, optically clear adhesives, combinations thereof, or the like. The electronic displays 15 may include a display layer 11 and a backlight 13, in exemplary embodiments, without limitation. In other exemplary embodiments, a separate backlight 13 is not required (e.g., OLED). An air gap 19 may be provided between the cover 17 and the electronic display 15, though such is not necessarily required. The air gap 19 may provide an airflow pathway into and out of the side assembly 14, and/or within the side assembly 14. The electronic display 15 may optionally be touch sensitive and may include related components at the electronic display 15 and/or cover 17.

An airflow channel 21 may optionally be provided rearward of, or form a rear portion of, the electronic display 15. For example, without limitation, the airflow channel may extend along all or substantially (e.g., 80% or more) of the backlight 13, where utilized. The airflow channel 21 may be part of the side assembly 14.

The side assemblies 14 need not necessarily include an electronic display 15. The side assemblies 14 may comprise a static poster cavity (hereinafter also a "poster side assembly"), an access panel (hereinafter also a "door side assembly"), and/or panel (hereinafter also a "panel side assembly"), by way of non-limiting example. For example, a digital side assembly 14 may be positioned at a first side of the structural framework 12 and a door side assembly at a second side of the structural framework 12. These examples are by way of illustration and are not intended to be limiting.

The display assembly 10 may include one or more heat exchangers 23, such as multi-layer, ducted passageways providing cross-flow, counterflow, and/or parallel flow. The heat exchanger(s) 23 may, in exemplary embodiments, be provided rearward of the side assembly 14, and may be attached to the structural framework 12.

The display assembly 10 may comprise one or more airflow pathways. The airflow pathways may form open pathways for ambient air ingested/exhausted to the ambient environment and/or closed pathways within the display assembly 10 for circulating gas. The open pathway(s) may include the airflow channel 21. The open pathway(s) may include at least certain layers and/or portions of the heat exchanger(s) 23. One or more of the closed pathway(s) may optionally include, without limitation, the air gap 19 of any of the one or more the side assemblies 14 and/or at least certain layers of or portions of the heat exchanger(s) 23.

Fans 29 and/or intakes/exhausts 16 may be provided, such as at a respective one of the one or more side assemblies 14 and/or the structural framework 12, for ingesting, exhausting, and/or moving such ambient air and/or circulating gas. The fan(s) 29 may be provided as part of the side assembly 14, or separate therefrom.

The open and/or closed pathways may be provided entirely within a respective one of the one or more side assemblies 14, between the side assemblies 14 (where multiple are provided) of a respective display assembly 10, within the display assembly 10 but outside of a respective one of the one or more side assemblies 14, combinations thereof, or the like. In exemplary embodiments, without limitation, any closed pathway(s) may be separated from the ambient environment and/or any open pathway(s) in accordance with at least ingress protection code IP 55 or higher (e.g., 56, 57, 65, 66, 67, etc.) as defined by the International Electrotechnical Commission at least as of the filing date of this application (https://www.iec.ch/ip-ratings).

A space between the side assemblies 14 and/or structural framework 12 of the display assembly may define, at least in part, a cavity 18 for circulating gas. The cavity 18 may form part of one or all of any closed pathway(s) for the display assembly 10. Preferably, some or all of the electronics 31 (e.g., network connectivity devices, power modules, video players, controllers, processors, non-transitory electronic storage devices, circuit boards, computing devices, sensors, etc.) for operating the units 10 are located along or within the closed pathway(s), such as within the cavity 18. The some or all of the electronics 31 may, alternatively or additionally, be located along a rear surface of the airflow channel 21.

The heat exchanger(s) 23 may be located within the cavity 18. The heat exchanger(s) 23 may facilitate thermal interaction between the closed and open pathway(s).

At least some of the fan(s) 29, differential pressure sensor(s) 20, controller 28, humidity sensor(s) 22, temperature sensor(s) 32 may be located within the cavity 18 and/or within one or more of the one or more side assemblies 14.

The airflow pathways may be, for example, without limitation, as shown and/or described in one or more of: U.S. Pat. No. 9,629,287 granted Apr. 18, 2017 entitled SYSTEM FOR USING CONSTRICTED CONVECTION WITH CLOSED LOOP COOLING SYSTEM AS THE CONVECTION PLATE, U.S. Pat. No. 10,506,738 granted Dec. 10, 2019 entitled CONSTRICTED CONVECTION COOLING FOR AN ELECTRONIC DISPLAY, U.S. Pat. No. 11,540,418 granted Dec. 27, 2022 entitled ELECTRONIC DISPLAY WITH COOLING, and/or U.S. Pat. No. 11,032,923 granted Jun. 8, 2021 entitled FIELD SERVICEABLE DISPLAY ASSEMBLY, the disclosures of each of the foregoing being hereby incorporated by reference as if fully restated herein. Other types and/or kinds of airflow pathways may be utilized. The display assemblies 10 may include some or all of the components of the foregoing disclosures incorporated by reference.

Various types and kinds of sensors for detecting various types and kinds of conditions of the display assembly 10 and/or side assemblies 14 may be provided at various locations at the assembly 10. In exemplary embodiments, without limitation, such sensors comprise at least one differential pressure sensor 20 located at, or fluidly connected to, one of the closed pathway(s) (e.g., cavity 18, associated portions/layers of heat exchanger(s) 23, air gap 19) and the ambient environment (directly or by way of connection to one of the open pathway(s) or components thereof (e.g., airflow channel 21, associated portions/layers of heat exchanger(s) 23)), at least one humidity sensor 22, preferably located at, or fluidly connected to, the closed pathway (s), and at least one door sensor associated with each of the one or more side assemblies 14 (e.g., at one or more contact points between structural framework 12 and side assembly 14). The differential pressure sensor 20 and/or humidity sensor 22 may be in electronic communication with a controller 28 of the display assembly 10, which is local to the display assembly 10 and/or remote therefrom.

The door sensor(s) may comprise a switch 24 located where a respective one of the side assemblies 14 is located when in the closed positioned so as to detect movement of the respective side assembly 14 into the closed position. Alternatively, or additionally, the door sensor(s) may comprise a proximity sensor 26 located at a position of the display assembly 10 to detect a distance of the side assembly 14 to the structural framework 12 (e.g., at a respective one of the side assemblies 14 and/or the structural framework 12). The proximity sensor 26 may comprise a magnet and magnetic field sensor, ultrasonic sensor, RFID tag, laser and optical sensor, combinations thereof, or the like. The door sensor(s) may be configured to determine if a respective one of the side assemblies 14 is located in a closed position or an opened position. While sometimes discussed as used with the side assemblies 14, the door sensors may be used with access panels/door assemblies, static posters, or the like, where such components are utilized. The switch 24 and/or proximity sensor 26 may be provided at the structural framework 12 and/or the side assembly 14.

Figure 5:
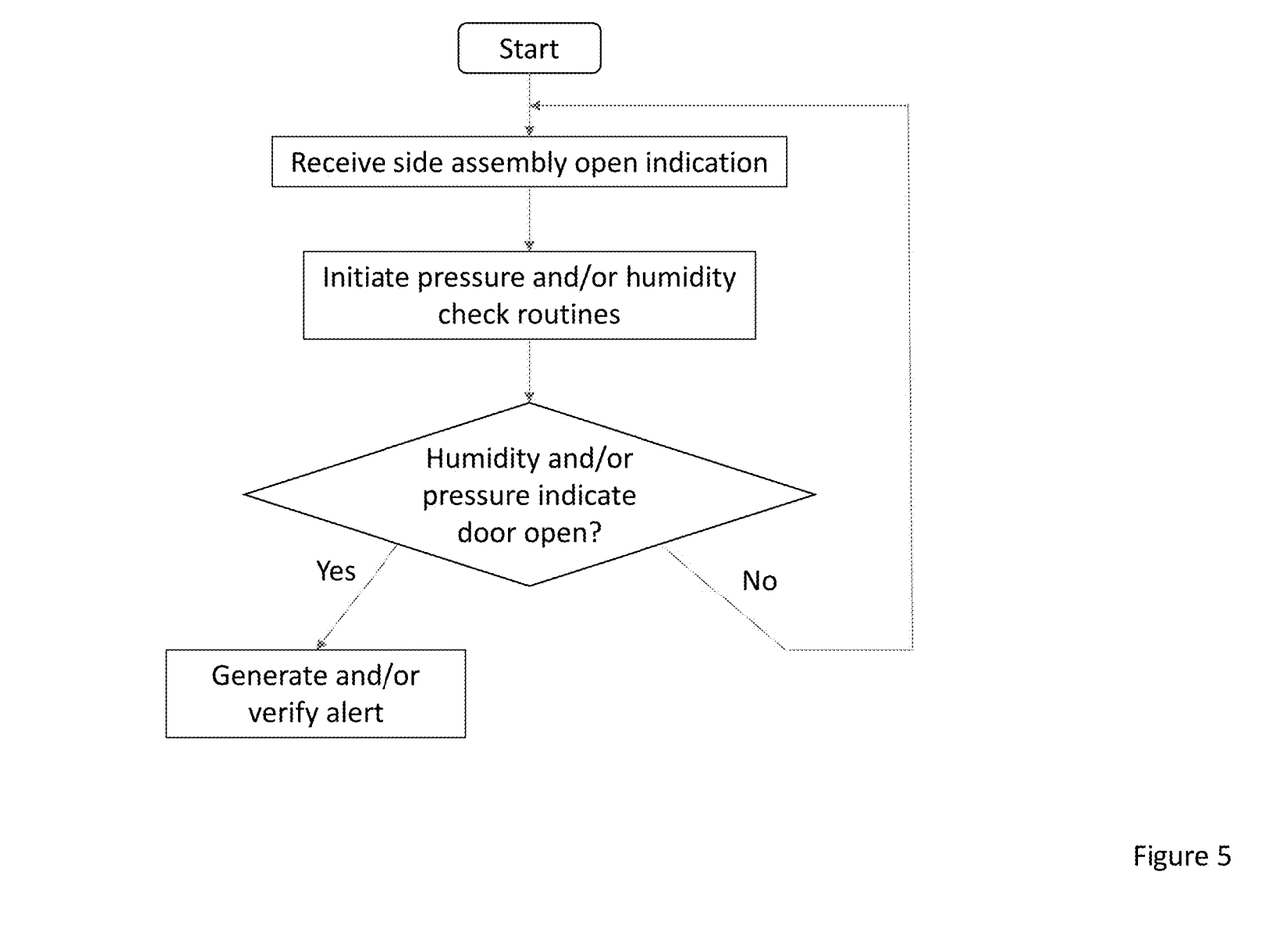
FIG. 5 is a flow chart with logic for operating the display assembly of FIGS. 1-3.

FIG. 5 illustrates an exemplary flow chart for operating the display assembly 10. Where an initial indication is received that one of the side assemblies 14 (or other door/access panel type component) is in the opened position, air characteristic check routines may be initiated. The air characteristic check routines may check pressure, humidity, combinations thereof, or the like. The air characteristic check routines may comprise pressure check routines, humidity check routines, combinations thereof, or the like. The indication that the side assembly 14 is in the opened position may be determined based on data received from one or both of the switch 24 and/or the proximity sensor 26. For example, without limitation, where the proximity sensor 26 indicates that the side assembly is at least a predetermined distance (e.g., more than 0.5 inches, without limitation) from the structural framework 12, the side assembly 14 may be considered open. Alternatively, or additionally, where the switch 24 is in a given position (e.g., open from no longer being in contact with the structural framework 12 or a latch mechanism within one or both of the side assembly 14 or the structural framework 12), then the side assembly 14 may be considered open. Such an initial determination may be made by way of the controller 28.

The pressure check routine may be performed in accordance with some or all of the disclosures of PCT Pub. No. WO 2023/009477 the entirety of which is hereby incorporated by reference as if fully restated herein. For example, without limitation, field deployed leak down testing in accordance with the '477 PCT Pub. may be performed. The display assembly 10 may comprise some or all of the components, programming routines, and/or arrangements shown and/or described in the '477 PCT Pub. patent by way of non-limiting example. The humidity check routine may be performed in accordance with some or all of the disclosures of US Pub. No. 2023/0333423 the entirety of which is hereby incorporated by reference as if fully restated herein. For example, without limitation, a dew point spread (DPS) may be in accordance with the '432 Pub. The display assembly 10 may comprise some or all of the components, programming routines, and/or arrangements shown and/or described in the '432 Pub. patent by way of non-limiting example. The DPS may be determined by way of the controller 28.

Where the pressure check routine and/or humidity check routines indicate a change in pressure and/or humidity levels, respectively, during or following the routine(s) outside of certain predetermined parameters (e.g., significant changes), the initial indication may be considered confirmed and/or an electronic notification may be generated and/or transmitted, such as by way of the controller 28. Optionally, an electronic notification may also be generated and/or transmitted for the initial indication and the second electronic notification may include a confirmation of the initial indication. One or both routines may be performed. Where more than one routine is performed, changes outside of certain predetermined parameters (e.g., significant changes) in one or both may be required to perform generating and/or transmitting the electronic notification. A significant pressure change may be determined where the display assembly 10 changes in leak down time by at least a predetermined threshold (e.g., 1 second, 3 seconds, or a wide variety of user determined thresholds), by way of non-limiting example. A significant humidity change may be determined where the DPS drops by more than at least a predetermined threshold (e.g., 1 degree Celsius, 3 degrees Celsius, or a wide variety of user determined thresholds), by way of non-limiting example.

In exemplary embodiments, without limitation, the parameters may include pressure and/or humidity categories. The category parameters or thresholds may be stored at the controller 28. The categories may be universal or display unit 10 specific. For example, without limitation, a leak down time above a first threshold may indicate generally well-sealed unit 10, a leak down time below the first threshold but above a second threshold may indicate average sealed unit 10, and a leak down time below the second threshold may indicate poorly sealed unit 10. As another example, without limitation, a DPS above a first threshold may indicate condensation not likely present, a DPS below the first threshold but above a second threshold may indicate condensation possibly present, and a DPS below the second threshold may indicate condensation likely present.

Where a certain category is reached and/or when the unit 10 changes categories (e.g., from a last test), the initial indication may be considered confirmed. A wide variety of number and type of categories may be utilized for pressures and/or humidity, such as but not limited to a respective 1-5 category/classification. Where the display assembly 10 changes categories, a significant humidity change may be determined.

Alternatively, or additionally, a check may be made to see if leak down time and/or DPS has reached a certain category, is decreasing, has decreased (e.g., dropped one category, dropped multiple categories) to determine if the alert should be generated and/or transmitted.

Alternatively, or additionally, a check may be made to see if pressure readings are outside a typical daily pressure range, daily pressure high, daily pressure low, outside a daily pressure average, combinations thereof, or the like. Some or all of the foregoing may include a predetermined margin, such as to account for routine errors or other conditions, minimize alerts for temporary or transient conditions, combinations thereof, or the like. Such a margin may be particularly useful for the daily pressure average. The margin for the daily pressure average may be at least one, two, or three standard deviations of the daily pressure average (in the upward and/or downward direction from the average), by way of non-limiting example. The margin may, alternatively or additionally, be temporal, such as to allow a period of time (e.g., 1 second, 3 seconds, 1 minute, etc.) to see if the value continues to remain outside of the respective parameter. The typical daily pressure range, daily pressure high, daily pressure low, and/or daily pressure average may be predetermined data points, such as based on testing results, idealized calculations, expected parameters, combinations thereof, or the like. Alternatively, or additionally, the typical daily pressure range, daily pressure high, daily pressure low, and/or daily pressure averages may be derived data points, such as from some or all historic operations data for the unit 10, such as using known statistical analysis techniques. For example, without limitation, data from the prior 24 hours or some other time period (e.g., some test case or baseline time period) may be used to derive such data points.

Such derivations or determinations of parameters may be made locally, such as at the controller 28, or remotely. Such derivations or determinations of parameters may optionally be made updated over time, such as using one or more machine learning techniques. Such derivations or determinations of parameters may be user determined variables which may be updated from time to time, such as based on instructions received from one or more remote electronic devices.

Alternatively, or additionally, the routines shown and/or described herein may provide the initial indication as well as the confirmation. For example, without limitation, the controller 28 may be configured to perform a leak down test or DPS calculation may be run from time-to-time (e.g., periodically). Where a certain parameter is reached (e.g., threshold, rate of change, category change, category reached, combinations thereof, or the like), the initial determination may be made (and optionally alert generated). The controller 28 may be configured to automatically run an additional leak down test or DPS calculation may be run thereafter, such as after a predetermined period of time, at a different time of day, at the same time the next day, combinations thereof, or the like. Where a certain parameter is reached (e.g., threshold, rate of change, category change, category reached, combinations thereof, or the like), the initial determination may be confirmed and/or alert generated.

The determinations and/or alerts shown and/or described herein may be determined and/or generated locally to the display assembly 10 and/or remotely (e.g., at the controller 28).

The electronic alert/notification may be an initial alert/notification and/or a confirmatory type of alert/notification.

Figure 6:
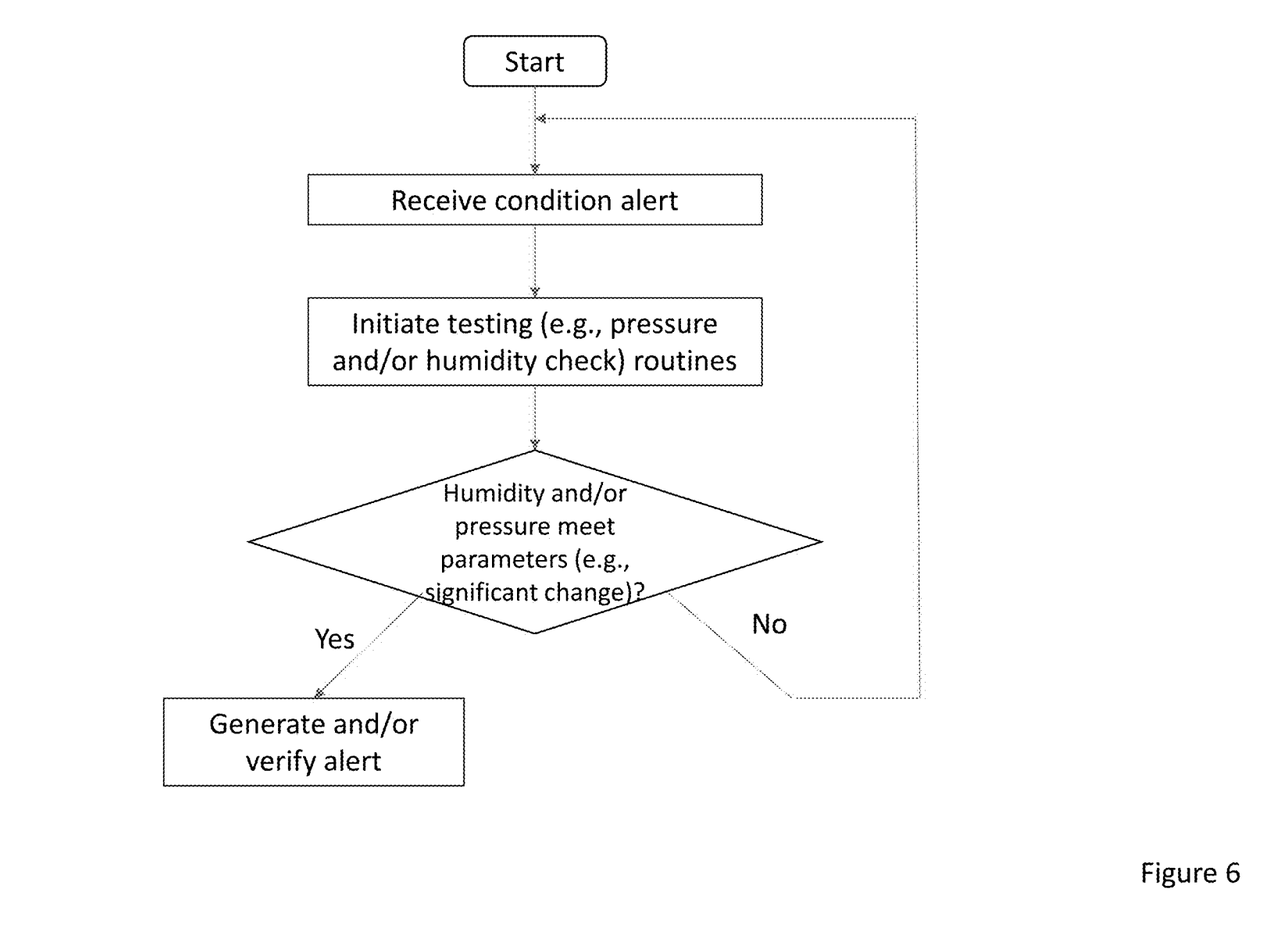
FIG. 6 is a flow chart with other exemplary logic for operating the display assembly of FIGS. 1-3.

As illustrated in FIG. 6, similar approaches may be applied to verifying other conditions of the display assembly 10, such as but not limited to, ability to hold pressure (e.g., how well sealed the unit is), condensation conditions (e.g., condensation likely present), combinations thereof, or the like. An initial indication of a likely leak or condensation, such as by way of a low pressure reading, a low leak down time, a high humidity reading, a low DPS reading, change in pressure and/or humidity classification, combinations thereof, or the like may be used as a preliminary indication to trigger verification, by way of non-limiting example. A testing routine, such as but not necessarily limited to, a leakdown test and/or humidity test, may be performed. Where a significant change is determined, this may indicate that the unit 10 has changed state, which may confirm the initial indication. Where no change and/or an insignificant change is determined, this may indicate that the unit 10 has not changed state, and therefore the initial indication may be discarded, ignored, and/or left unconfirmed/unverified.

Figure 7:
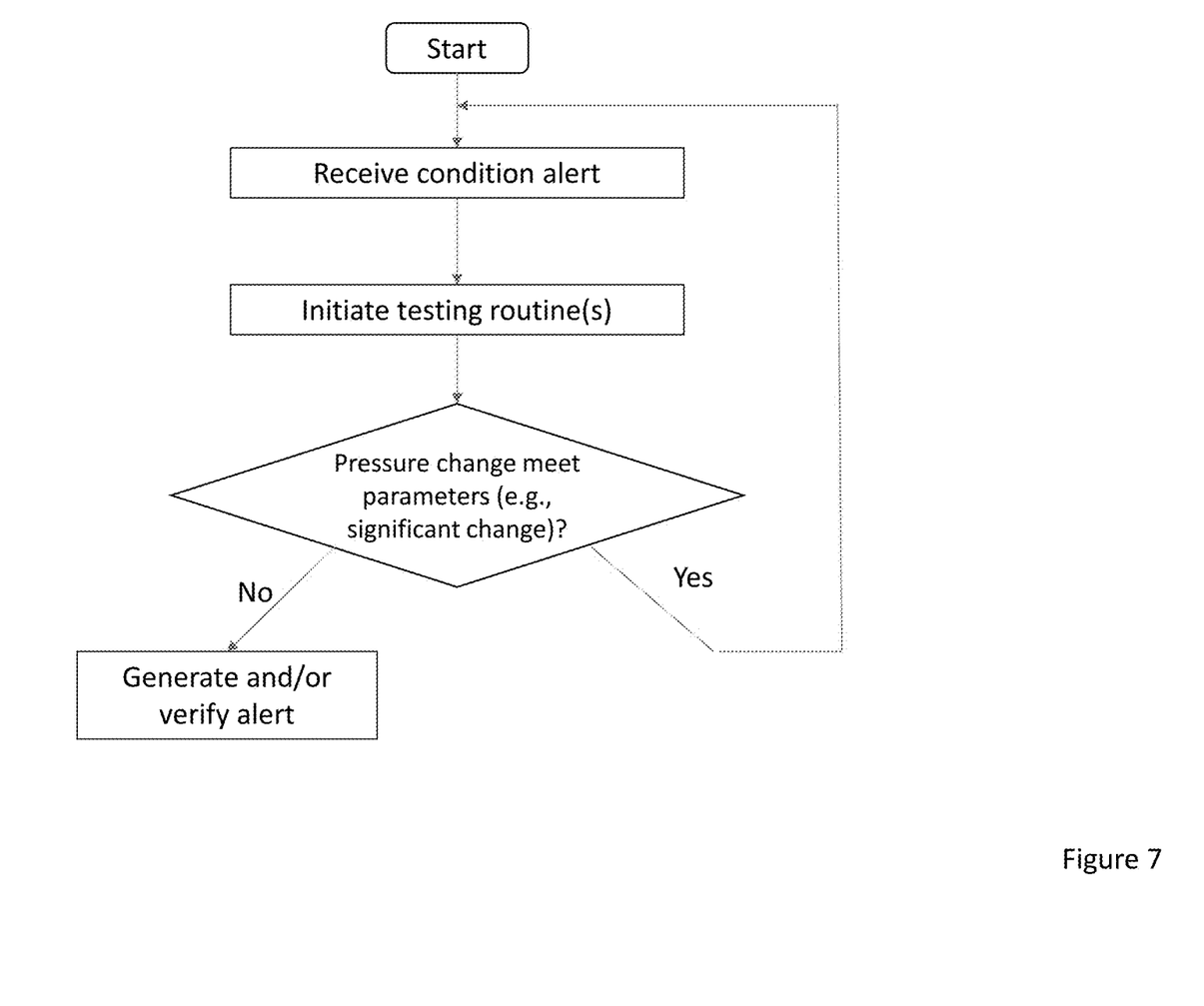
FIG. 7 is a flow chart with other exemplary logic for operating the display assembly of FIGS. 1-3.

As illustrated in FIG. 7, alternatively, or additionally, after a condition alert is triggered, one or more testing routines may be initiated for verifying the existence of the condition which triggered the alert. In exemplary embodiments, without limitation, such testing routines may include issuing one or more commands which are intended to cause an increase of heat generated within the unit 10. For example, without limitation, the commands may include commands to increase illumination levels of the electronic display 15 (e.g., backlight 13), decrease certain speed levels of the fan(s) 29 (e.g., those associated with some or all of any open pathways), such as down to zero, combinations thereof, or the like. These actions may cause internal temperature within the units 10 to increase, such as measured by one or more temperatures sensors 32. In exemplary embodiments, without limitation, these routines may be performed to increase heat, in particular, within closed pathway(s) or areas (e.g., channel 21, cavity 18, heat exchanger 23), though the heat may be increased in other areas, such as the open pathway(s).

With a relatively well sealed unit 10, increasing heat within the closed areas may be expected to result in a significant pressure increase. With a less well sealed or leaky unit 10, increasing heat within the closed areas may be expected to result in no to an insignificant pressure increase.

Some or all of the temperature sensor(s) 32, pressure sensor(s) 20, humidity sensor(s) 22, combinations thereof, or the like, may be provided within, and/or in fluid connection with, some or all of any closed pathways within the units 10, such as to detect air characteristic changes to the air within the same.

The commands may also include commands to increase the speed level of certain other fans 29 (e.g., those associated with some or all of any closed pathways), and/or at least be maintained at a minimum level. This may assist with preventing overheating and/or ensuring sufficient uniformity of heat to provide sufficiently accurate readings at the temperature sensor(s) 32.

Where a measured pressure change (e.g., by way of the pressure sensor(s) 20) during some or all of the testing routine is significant, that may indicate that the unit 10 remains relatively well sealed such that the condition is considered unverified and/or no alert is issued. For example, if a door were open (an exemplary condition that may initially be detected), thereby exposing the closed and/or other sealed or partially sealed area to ambient, little or no pressure response may be expected due to the lack of sufficient sealing. Thus, where no significant pressure change is found under such automated testing routines, it may be concluded that the door is actually shut and/or that the sensor(s) indicating the door is opened are faulty. An alert or other indication of the same may optionally be generated and/or transmitted.

Where a measured pressure change during some or all of the testing routine is not significant, that may indicate that the unit 10 is no longer relatively well sealed and the condition may be considered verified and/or an alert may be generated. A significant pressure change may be some predetermined threshold, such as but not necessarily limited to, a minimum pressure change level, a minimum pressure rate of change level, a minimum pressure level, an acceptable pressure range, combinations thereof, or the like. Such parameter(s) may be pre-programed or derived from certain historical and/or testing information (e.g., automatically, manually by user set parameters, combinations thereof, or the like). By way of non-limiting example, the temperature change may be implemented relatively rapidly, such as over a one minute period. The rate or amount of pressure change may be monitored over that minute period against an expected rate or amount of change. The expected rate or amount of change may be determined, for example without limitation, from earlier testing. Other time periods may be utilized.

As used herein, the "condition" being verified may be leaking, door or other access panel or component open status, and/or need for service, by way of non-limiting example.

As used herein, "checks" or "routines" may refer to software instructions which, when executed, provides the stated functionality in a fully or at least partially automated fashion.

As used herein, the side assembly 14 or other normally moveable component may be in an "open" (e.g., non-closed) state where it is moved away from the structural framework 12 or in another configuration which reduces or removes the pressure barrier and/or provides access to an interior of the unit 10. This may include swinging part of the side assembly 14 away from the structural framework 12, such as on hinges, by way of non-limiting example. Contrary, these component(s) may be in a closed state where they are adjacent to the structural framework 12 or in another configuration which provides or enhances the pressure barrier and/or prevents normal access to the interior of the unit 10. This may include moving the side assembly 14 towards the structural framework 12 and/or lacking the same to the structural framework 12, by way of non-limiting example.

While alerts are sometimes shown and/or described, various types of notification and/or indications may be provided.

Where conditions are initially found which trigger some or all of the routines and/or checks shown and/or described herein, but those initially triggering conditions are considered unverified after the checks and/or routines are completed, the controller 28 may be configured to generate an alert or other indication that a sensor or other component associated with the initial triggering condition or event is faulty, in exemplary embodiments, without limitation. For example, without limitation, if a door sensor initially indicates that a door is open, but the testing routine indicates that significant pressure changes are found with temperature changes (and thus the unit remains relatively well sealed), an alert may instead be generated indicating that the door sensor is likely faulty.

The controller 28 may be configured to automatically generate one or more repair orders, tickets, combinations thereof, or the like and transmit such items to appropriate parties to initiate repair or remedy of any detected conditions, such as following verification of the same. Such repair orders, tickets, combinations thereof, or the like may be dispatched to teams specific to the type of condition detected and/or may comprise information identifying the unit 10 and/or the condition(s) detected.

The data used for verifying the display assembly 10 condition does not have to be the same data which triggered the analysis. For example, if a low DPS indication is generated, an analysis may be made of pressure to see if pressure has changed significantly (e.g., dropped one or more categories of leak down time, thereby indicating that the unit is less well sealed) to verify the condition and/or need for servicing. Similarly, if indication of a likely leak is made, the DPS may be analyzed to verify the condition. Such cross-referencing may be preferred to enhance verification.

While the alert/notifications shown and/or described herein are sometimes referred to as being triggered by an indication (e.g., likely leak, low DPS), the display assemblies 10 may be programmed, and/or may be programmable, to perform such analysis without the need for an initial indication, such as in response to a command to provide such an analysis, which may be triggered manually, automatically (e.g., periodically, randomly, etc.), or the like. In such instances, the alerts/notifications may be the first or original indication that such conditions may be present (e.g., instead of verifying already indicated conditions).

The illustrated size, shape, and/or location of at least certain components shown and/or described herein, such as but not limited to, the differential pressure sensor(s) 20, controller(s) 28, humidity sensor(s) 22, temperature sensor(s) 32, fan(s) 29, electronic(s) 31, switch 24, proximity sensor(s) 26, and/or heat exchanger(s) 23 are exemplary and not intended to be limiting.

Various size and/or shape side assemblies 14, electronic displays 15, and/or structural frameworks 12 may be utilized.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectively components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A display assembly utilizing air characteristic data to verify internal operating conditions, said display assembly comprising:
   a structural framework;
   a side assembly connected to the structural framework and comprising an electronic display;
   a closed airflow pathway;
   one or more sensors, at least one of which is located at, or fluidly connected to, the closed airflow pathway; and
   a controller in electronic communication with the electronic display, and the one or more sensors, said controller comprising one or more non-transitory electronic storage devices comprising software instructions, which when executed, configure one or more processors to:
      receive data from at least one of the one or more sensors;
      determine, based on the data, whether an initial indication of an operating condition exists, and if so:
         initiate a testing routine;
         receive additional data from at least one of the one or more sensors during and/or following initiation of the testing routine; and
         confirm, based on the additional data, whether the operating condition exists.

2. The display assembly of claim 1 wherein:
   the one or more sensors comprise at least one humidity sensor or temperature sensor;
   the testing routine comprises determining a dew point spread based, at least in part, on the additional data from the at least one humidity sensor or temperature sensor; and
   the operating condition is confirmed where the dew point spread is within a predetermined margin of zero.

3. The display assembly of claim 1 wherein:
   the one or more sensors comprise at least one differential pressure sensor fluidly connected to an ambient environment;
   the testing routine comprises determining a differential pressure reading based on the additional data from the at least one differential pressure sensor; and
   the operating condition is confirmed where the differential pressure reading is within a predetermined margin of zero.

4. The display assembly of claim 1 wherein:
   the one or more sensors comprise at least one differential pressure sensor fluidly connected to an ambient environment;
   the testing routine comprises determining an initial differential pressure reading based on the data from the at least one differential pressure sensor, at least one of: commanding increase of an illumination level of the electronic display and commanding Assembly Operating Conditions, Systems and Methods for the Same decrease of an operating speed of a fan located along an open airflow pathway of the display assembly, and determining a time elapsed until subsequent differential pressure readings based on the additional data from the at least one differential pressure sensor return to a predetermined margin of the initial differential pressure reading; and
   the operating condition is confirmed where the time is less than a predetermined threshold value.

5. The display assembly of claim 4 wherein:
   the testing routine comprises commanding increase of the illumination level of the electronic display and commanding decrease of the operating speed of the fan located along the open airflow pathway of the display assembly.

6. The display assembly of claim 1 wherein:
   the one or more sensors comprises at least one differential pressure sensor fluidly connected to an ambient environment;
   the testing routine comprises at least one of: commanding increase of an illumination level of the electronic display and commanding decrease of an operating speed of a fan located along an open airflow pathway of the display assembly, and determining a time elapsed until subsequent differential pressure reading based on the additional data from the at least one differential pressure sensor return to a predetermined margin of a historical differential pressure reading; and
   the operating condition is confirmed where the time is less than a predetermined threshold value.

7. The display assembly of claim 6 wherein:
   the historical differential pressure value comprises a baseline differential pressure reading for the display assembly.

8. The display assembly of claim 1 wherein:
   the one or more sensors comprises at least one differential pressure sensor fluidly connected to an ambient environment;
   the testing routine comprises determining an initial differential pressure reading based on the data from the at least one differential pressure sensor, at least one of: commanding increase of an illumination level of the electronic display and commanding decrease of an operating speed of a fan located along an open airflow pathway of the display assembly, and determining a subsequent differential pressure reading based on the additional data from the at least one differential pressure sensor; and
   the operating condition is confirmed where a change between the initial differential pressure reading and the subsequent differential pressure reading is less than a predetermined threshold value.

9. The display assembly of claim 1 wherein:
   the one or more sensors comprises at least one differential pressure sensor fluidly connected to an ambient environment;

the testing routine comprises at least one of: commanding increase of an illumination level of the electronic display and commanding decrease of an operating Assembly Operating Conditions, Systems and Methods for the Same speed of a fan located along an open airflow pathway of the display assembly, and determining a differential pressure reading based on the additional data from the at least one differential pressure sensor; and the operating condition is confirmed where a change between the differential pressure reading and a historical differential pressure value for the display assembly is less than a predetermined threshold value.

10. The display assembly of claim 1 wherein:
the one or more sensors comprises at least one of: a switch and a proximity sensor for the side assembly;
the initial indication of the operating condition is determined, at least in part, based on the data from the at least one of: the switch and the proximity sensor;
the side assembly is movable relative to the structural framework; and
the operating condition comprises the side assembly in an open state where the side assembly is moved away from the structural framework.

11. The display assembly of claim 10 wherein:
the controller comprises additional software instructions stored at the one or more non-transitory electronic storage devices, which when executed, configure the one or more processors to: determine that the at least one of: the switch and the proximity sensor is faulty where the operating condition is not confirmed based on the additional data from the one or more sensors.

12. The display assembly of claim 1 wherein:
the operating condition comprises a leaky unit.

13. The display assembly of claim 12 wherein:
the one or more sensors comprises at least one differential pressure sensor fluidly connected to an ambient environment; and
the initial indication of the operating condition is determined where the data from the at least one differential pressure sensor is below a predetermined threshold.

14. The display assembly of claim 12 wherein:
the one or more sensors comprises at least one humidity sensor or temperature sensor; and
the initial indication of the operating condition is determined where a dew point spread determined, at least in part from the data from the at least one humidity sensor or temperature sensor, is below a predetermined threshold.

15. The display assembly of claim 1 wherein:
the one or more sensors comprise a first sensor of a first type and a second sensor of a second type;
the initial indication of the operating condition is determined, at least in part, from the data from the first sensor and without data from the second sensor; and
the operating condition is confirmed from the additional data from the second sensor and without data from the first sensor.

16. The display assembly of claim 1 wherein:
the controller comprises additional software instructions stored at the one or more non-transitory electronic storage devices, which when executed, configure the one or more processors to: generate and transmit an electronic notification comprising the operating condition following confirmation of the operating condition.

17. The display assembly of claim 1 wherein:
the electronic display comprises a liquid crystal display and a backlight.

18. A display assembly utilizing air characteristic data to verify internal operating conditions, said display assembly comprising:
a structural framework;
a side assembly connected to the structural framework and comprising an electronic display;
a closed airflow pathway;
a first sensor of a first type;
a second sensor of a second type, wherein said second sensor is located at, or fluidly connected to, the closed airflow pathway; and
a controller in electronic communication with the electronic display, and the one or more sensors, said controller comprising one or more non-transitory electronic storage devices comprising software instructions, which when executed, configure one or more processors to:
receive data from the first sensor;
determine, at least in part from the data received from the first sensor, an initial indication of an operating condition;
initiate a testing routine;
receive data from the second sensor during and/or following initiation of the testing routine; and
confirm, based at least in part on the data received from the second sensor, whether the operating condition exists.

19. The display assembly of claim 18 wherein:
the data from the second sensor is not used to determine the initial indication of the operating condition; and
the data from the first sensor is not used to confirm the operating condition.

20. A method for verifying internal operating conditions of a display assembly using air characteristic data, said method comprising:
receiving, at a controller of the display assembly, data from a first sensor of a first type of the display assembly;
determining, at the controller and based at least in part on the data received from the first sensor, an initial indication of an operating condition of the display assembly;
initiating, by way of the controller, a testing routine at the display assembly;
receiving, at the controller, data from a second sensor of the display assembly of a second type during and/or following initiation of the testing routine; and
confirming, at the controller and based at least in part on the data received from the second sensor, whether the operating condition exists.

* * * * *

UNITED STATES PATENT AND TRADEMARK OFFICE
CERTIFICATE OF CORRECTION

| | |
|---|---|
| PATENT NO. | : 12,393,241 B1 |
| APPLICATION NO. | : 19/087140 |
| DATED | : August 19, 2025 |
| INVENTOR(S) | : William Dunn et al. |

Page 1 of 1

It is certified that error appears in the above-identified patent and that said Letters Patent is hereby corrected as shown below:

In the Claims

In Column 12, Lines 9-10, Claim 4, please delete "Assembly Operating Conditions, Systems and Methods for the Same".

In Column 13, Lines 4-5, Claim 9, please delete "Assembly Operating Conditions, Systems and Methods for the Same".

Signed and Sealed this
Fourteenth Day of October, 2025

John A. Squires
*Director of the United States Patent and Trademark Office*